United States Patent
Yoo et al.

(10) Patent No.: US 12,447,377 B2
(45) Date of Patent: Oct. 21, 2025

(54) EXERCISE EQUIPMENT DEVICE

(71) Applicant: DRAX INC., Anyang-si (KR)

(72) Inventors: Seon Kyung Yoo, Seoul (KR); Jae Sang Park, Seongnam-si (KR)

(73) Assignee: DRAX INC., Anyang-si (KR)

( * ) Notice: Subject to any disclaimer, the term of this patent is extended or adjusted under 35 U.S.C. 154(b) by 329 days.

(21) Appl. No.: 18/007,121

(22) PCT Filed: Dec. 2, 2020

(86) PCT No.: PCT/KR2020/017473
§ 371 (c)(1),
(2) Date: Jan. 27, 2023

(87) PCT Pub. No.: WO2022/030696
PCT Pub. Date: Feb. 10, 2022

(65) Prior Publication Data
US 2023/0226410 A1    Jul. 20, 2023

(30) Foreign Application Priority Data

Aug. 5, 2020   (KR) .................. 10-2020-0098134
Nov. 24, 2020  (KR) .................. 10-2020-0159084

(51) Int. Cl.
*A63B 24/00*   (2006.01)
*A63B 71/06*   (2006.01)

(52) U.S. Cl.
CPC ...... *A63B 24/0062* (2013.01); *A63B 71/0622* (2013.01); *A63B 2024/0068* (2013.01);
(Continued)

(58) Field of Classification Search
CPC ............ A63B 24/0062; A63B 71/0622; A63B 2024/0068; A63B 2024/0093;
(Continued)

(56) References Cited

U.S. PATENT DOCUMENTS

| 4,986,538 | A | * | 1/1991 | Ish, III | ............... | A63B 21/0628 |
| | | | | | | 482/102 |
| 5,409,435 | A | * | 4/1995 | Daniels | ................. | F16D 57/002 |
| | | | | | | 482/901 |

(Continued)

FOREIGN PATENT DOCUMENTS

JP    2004-65382 A    3/2004
JP    2013-103020 A   5/2013
(Continued)

OTHER PUBLICATIONS

Office Action issued Jul. 27, 2023 in Korean Application No. 10-2023-0082133.

(Continued)

*Primary Examiner* — Garrett K Atkinson
(74) *Attorney, Agent, or Firm* — Sughrue Mion, PLLC

(57) ABSTRACT

An exercise equipment device includes an exercise device body including a load applying unit configured to add, reduce, or maintain a load according to a set exercise level, a user manipulation unit moving according to a movement of a user, and a load transmitting unit configured to transmit the load applied by the load applying unit to the user manipulation unit, a sensor configured to detect movement information of the user manipulation unit, a user input unit configured to input user information, and a processor configured to determine a first user motion range based on a detection result of the sensor and the user information, wherein the processor is further configured to determine the first user motion range based on the user information, an upper limit movement range and a lower limit movement range.

15 Claims, 17 Drawing Sheets

(52) U.S. Cl.
CPC . *A63B 2024/0093* (2013.01); *A63B 2071/065* (2013.01); *A63B 2220/20* (2013.01); *A63B 2225/20* (2013.01)

(58) Field of Classification Search
CPC .......... A63B 2071/065; A63B 2220/20; A63B 2225/20; A63B 21/0058; A63B 2024/0012; A63B 2071/0072; A63B 2071/0627; A63B 21/0628; A63B 2071/068; A63B 24/0087; A63B 71/0054; A63B 2071/0694; G16H 40/63; G16H 20/30; G16H 40/67
See application file for complete search history.

(56) References Cited

U.S. PATENT DOCUMENTS

| | | | | |
|---|---|---|---|---|
| 5,971,896 | A * | 10/1999 | Giannelli | A63B 23/1209 |
| | | | | 482/136 |
| 6,162,151 | A * | 12/2000 | Tani | A63B 71/0009 |
| | | | | 482/69 |
| 6,254,516 | B1 * | 7/2001 | Giannelli | A63B 23/1209 |
| | | | | 482/136 |
| 7,771,319 | B1 * | 8/2010 | Spoeth, Jr. | A63B 21/152 |
| | | | | 482/8 |
| 8,932,241 | B2 * | 1/2015 | Sankai | A61B 5/24 |
| | | | | 601/5 |
| 9,687,694 | B2 * | 6/2017 | Chen | A63B 24/0062 |
| 9,770,658 | B2 * | 9/2017 | Bentley | A63F 13/428 |
| 10,661,112 | B2 * | 5/2020 | Orady | A63B 71/0054 |
| 10,814,172 | B1 * | 10/2020 | Ilfrey | A63B 23/035 |
| 10,898,758 | B2 * | 1/2021 | Bengtsson | A63B 21/063 |
| 10,926,128 | B2 * | 2/2021 | Yoo | A63B 22/0023 |
| 11,439,862 | B2 * | 9/2022 | Anderson | A63B 21/0023 |
| 2005/0233871 | A1 * | 10/2005 | Anders | A63B 21/078 |
| | | | | 482/8 |
| 2005/0272561 | A1 * | 12/2005 | Cammerata | A63B 23/0494 |
| | | | | 482/8 |
| 2010/0261580 | A1 | 10/2010 | Lannon et al. | |
| 2011/0065549 | A1 * | 3/2011 | Jung | A63B 24/0062 |
| | | | | 482/4 |
| 2012/0220429 | A1 * | 8/2012 | Yoshida | A63B 71/0686 |
| | | | | 482/8 |
| 2015/0302331 | A1 * | 10/2015 | Randall | G06Q 10/06311 |
| | | | | 705/7.13 |
| 2016/0193499 | A1 * | 7/2016 | Kim | G09B 19/0038 |
| | | | | 434/247 |
| 2017/0080287 | A1 * | 3/2017 | Jaquish | A63B 21/4034 |
| 2018/0021616 | A1 | 1/2018 | Orady et al. | |
| 2019/0247707 | A1 | 8/2019 | Lagree et al. | |
| 2019/0258905 | A1 * | 8/2019 | Rankin | G01P 15/034 |
| 2021/0016150 | A1 * | 1/2021 | Jeong | A61B 5/1036 |
| 2021/0299516 | A1 * | 9/2021 | Vermilyea | A63B 24/0021 |

FOREIGN PATENT DOCUMENTS

| | | |
|---|---|---|
| JP | 2020-48827 A | 4/2020 |
| KR | 20-0353290 Y1 | 6/2004 |
| KR | 10-2011-0029799 A | 3/2011 |
| KR | 10-2012-0014471 A | 2/2012 |
| KR | 10-1432129 B1 | 8/2014 |
| KR | 10-1571362 B1 | 11/2015 |
| KR | 10-1616545 B1 | 4/2016 |
| KR | 10-2016-0084703 A | 7/2016 |
| KR | 10-2017-0135591 A | 12/2017 |
| KR | 10-1871388 B1 | 6/2018 |
| KR | 10-2018-0100753 A | 9/2018 |
| KR | 10-1982168 B1 | 5/2019 |
| KR | 10-2019-0099555 A | 8/2019 |
| KR | 10-2019724 B1 | 9/2019 |
| KR | 10-2031243 B1 | 10/2019 |
| KR | 10-2020-0022776 A | 3/2020 |
| KR | 10-2088673 B1 | 3/2020 |
| KR | 10-2020-0064558 A | 6/2020 |
| WO | 2009/034309 A1 | 3/2009 |

OTHER PUBLICATIONS

Communication dated Aug. 26, 2024 issued by the European Patent Office in application No. 20948752.9.
Office Action dated Jan. 2, 2023 issued by the Korean Patent Office in Korean Application No. 10-2020-0159094.
Office Action dated Sep. 29, 2022 issued by the Korean Patent Office in Korean Application No. 10-2020-0159084.
Office Action dated Sep. 29, 2022 issued by the Korean Patent Office in Korean Application No. 10-2020-0159086.
Office Action dated Sep. 29, 2022 issued by the Korean Patent Office in Korean Application No. 10-2020-0159087.
Office Action dated Sep. 8, 2022 issued by the Korean Patent Office in Korean Application No. 10-2020-0159094.
"Frequently Asked Questions for Social Distancing Configuration", Bitla Solutions Simplified, Jun. 24, 2020, Bitla Software Pvt. Ltd., Retrieved from: https:www.bitlasoft.com/blog/frequently-asked-questions-for-social-distancing-configuration/ , pp. 1-8 (8 pages total).
International Search Report dated May 4, 2021 in International Application No. PCT/KR2020/017473.

* cited by examiner

EXERCISE EQUIPMENT DEVICE

CROSS REFERENCE TO RELATED APPLICATIONS

This application is a National Stage of International Application No. PCT/KR2020/017473 filed Dec. 2, 2020, claiming priority to Korean Patent Application No. 10-2020-0098134 filed Aug. 5, 2020 and Korean Patent Application No. 10-2020-0159084 filed Nov. 24, 2020, in the Korean Intellectual Property Office, the disclosures of which are incorporated herein by reference in their entireties.

TECHNICAL FIELD

The present disclosure relates to an exercise equipment device for monitoring a user's exercise on exercise equipment and guiding a motion range of the user based on monitored motion data of the user.

BACKGROUND ART

Exercise equipment using gravity, for example, a weight machine, applies a pre-set load to a user. The user may build muscle strength by moving a user manipulation unit in the direction of gravity or a direction opposite to the direction of gravity against the applied load.

A conventional exercise equipment device has an inconvenience in that a user has to manually set a user motion range, and thus, there is a limit to receiving a systematic exercise management service.

Also, when a user exercises using exercise equipment, he or she must be guided by a trainer to determine whether the exercise is accurately performed within his or her motion range, thereby increasing costs. In particular, when a user has little exercise experience, the user may not set a user motion range to suit characteristics of various exercise equipment devices. Accordingly, the user may have difficulty obtaining an expected exercise effect.

DISCLOSURE

Technical Problem

The present disclosure provides an exercise equipment device for automatically setting a user motion range by monitoring a user's exercise.

Also, the present disclosure provides an exercise equipment device for optimizing a user motion range based on user information along with monitored user exercise information.

Also, the present disclosure provides an exercise equipment device for continuously correcting a user motion range by tracking a user's exercise information history.

Technical Solution

An exercise equipment device according to an aspect of the present disclosure includes
an exercise device body including a load applying unit configured to add, reduce, or maintain a load according to a set exercise level, a user manipulation unit moving according to a movement of a user, and a load transmitting unit configured to transmit the load applied by the load applying unit to the user manipulation unit, a sensor configured to detect movement information of the user manipulation unit,
a user input unit configured to input user information, and
a processor configured to determine a first user motion range based on a detection result of the sensor and the user information,
wherein the processor is further configured to determine the first user motion range based on the user information, and an upper limit movement range in which the user manipulation unit maximally moves in one direction from a state in which the user manipulation unit is stopped and a lower limit movement range in which the user manipulation unit maximally moves in another direction from the state in which the user manipulation unit is stopped.

The exercise equipment device may further include a memory configured to store a first adjustment motion range determined according to the user information, wherein the processor is further configured to determine the first user motion range based on the first adjustment motion range, and the upper limit movement range and the lower limit movement range.

The exercise equipment device may further include a display configured to display output information to the user, wherein the memory is further configured to store a first critical motion range determined according to the user information, wherein the processor is further configured to, when the upper limit movement range and the lower limit movement range are outside the first critical motion range, control the display to display a warning signal and a re-measurement signal.

The processor may be further configured to, when the upper limit movement range and the lower limit movement range are outside the first critical motion range two or more times, determine the first upper limit movement range and the lower limit movement range as the first user motion range.

The user information may include at least one of the user's age, gender, height, weight, and exercise experience.

An exercise equipment device according to another aspect of the present disclosure includes
an exercise device body including a load applying unit configured to add, reduce, or maintain a load according to a set exercise level, a user manipulation unit moving according to a movement of a user, and a load transmitting unit configured to transmit the load applied by the load applying unit to the user manipulation unit,
a sensor configured to detect movement information of the user manipulation unit,
a user input unit configured to input user information, and
a processor configured to determine a second user motion range based on a detection result of the sensor and the user information,
wherein the processor is further configured to determine the second user motion range based on an upper limit average movement range that is an average value of upper limit movement ranges in which the user manipulation unit maximally moves in one direction multiple times from a state in which the user manipulation unit is stopped and a lower limit average movement range that is an average value of lower limit movement ranges in which the user manipulation unit maximally moves in another direction multiple times from the state in which the user manipulation unit is stopped.

The exercise equipment device may further include a memory configured to store a second adjustment motion range determined according to the user information, wherein the processor is further configured to determine the second user motion range based on the second adjustment motion range, and the upper limit average movement range and the lower limit average movement range.

The memory may be further configured to store a second critical motion range determined according to the user information.

The processor may be further configured to, when an upper limit movement range in which the user manipulation unit maximally moves in one direction from a state in which the user manipulation unit is stopped and a lower limit movement range in which the user manipulation unit maximally moves in another direction from a state in which the user manipulation unit is stopped are outside the second critical motion range, determine the second user motion range by excluding the upper limit movement range and the lower limit movement range in the upper limit average movement range and the lower limit average movement range.

The processor may be further configured to, when the upper limit movement range in which the user manipulation unit maximally moves in one direction from a state in which the user manipulation unit is stopped and the lower limit movement range in which the user manipulation unit maximally moves in another direction from a state in which the user manipulation unit is stopped are outside the second critical motion range three or more times, determine the second user motion range by including the upper limit movement range and the second lower limit movement range in the upper limit average movement range and the lower limit average movement range.

The user information may include at least one of the user's age, gender, height, weight, and exercise experience.

An exercise equipment device according to another aspect of the present disclosure includes an exercise device body including a load applying unit configured to add, reduce, or maintain a load according to a set exercise level, a user manipulation unit configured to move according to a movement of a user, and a load transmitting unit configured to transmit the load applied by the load applying unit to the user manipulation unit, a sensor configured to detect movement information of the user manipulation unit, a user input unit configured to input user information, a processor configured to determine a third user motion range based on a detection result of the sensor and the user information, a server configured to receive and store the third user motion range, and a communication unit configured to transmit the third user motion range determined by the processor to the server.

The processor may be further configured to control the communication unit to receive the third user motion range from the server, based on the user information input to the user input unit.

The exercise equipment device may further include a display configured to provide output information to the user, wherein the processor is further configured to control the display to display the third user motion range.

The processor may be further configured to determine a $3\text{-}1^{th}$ user motion range based on the third user motion range received from the server, and a plurality of upper limit movement ranges in which the user manipulation unit maximally moves in one direction multiple times from a state in which the user manipulation unit is stopped and a plurality of lower limit movement ranges in which the user manipulation unit maximally moves in another direction multiple times from the state in which the user manipulation unit is stopped.

The processor may be further configured to control the communication unit to transmit the $3\text{-}1^{th}$ user motion range to the server.

Other aspects, features, and advantages of the disclosure will become more apparent from the drawings, the claims, and the detailed description.

These general and specific embodiments may be implemented by using a system, a method, a computer program, or a combination thereof.

Advantageous Effects

An exercise equipment device according to an embodiment of the present disclosure may automatically set a user motion range by monitoring a user's exercise.

Also, an exercise equipment device according to an embodiment of the present disclosure may optimize a user motion range based on user information along with monitored user exercise information.

Also, an exercise equipment device according to an embodiment of the present disclosure may continuously correct a user motion range by tracking a user's exercise information history.

Also, an exercise equipment device according to an embodiment of the present disclosure may efficiently guide a user's exercise.

BEST MODE

Mode for Invention

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

It will be understood that although the terms "first," "second," etc. may be used herein to describe various elements, these elements should not be limited by these terms. The above terms are used only to distinguish one element from another.

Figure 1:
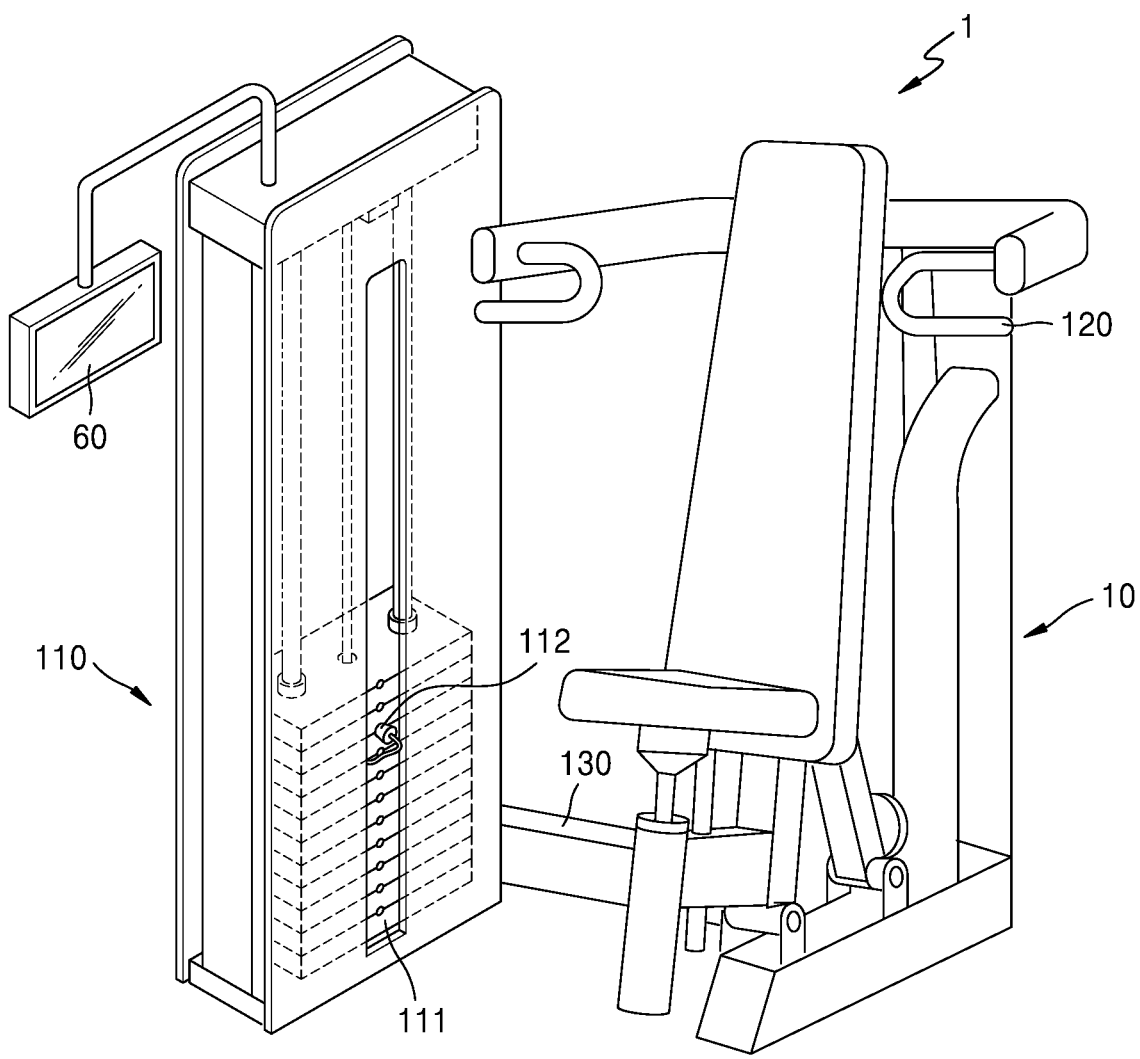
FIGS. 1 and 2 are respectively a perspective view and a block diagram for describing an exercise equipment device 1, according to an embodiment.
Figure 2:
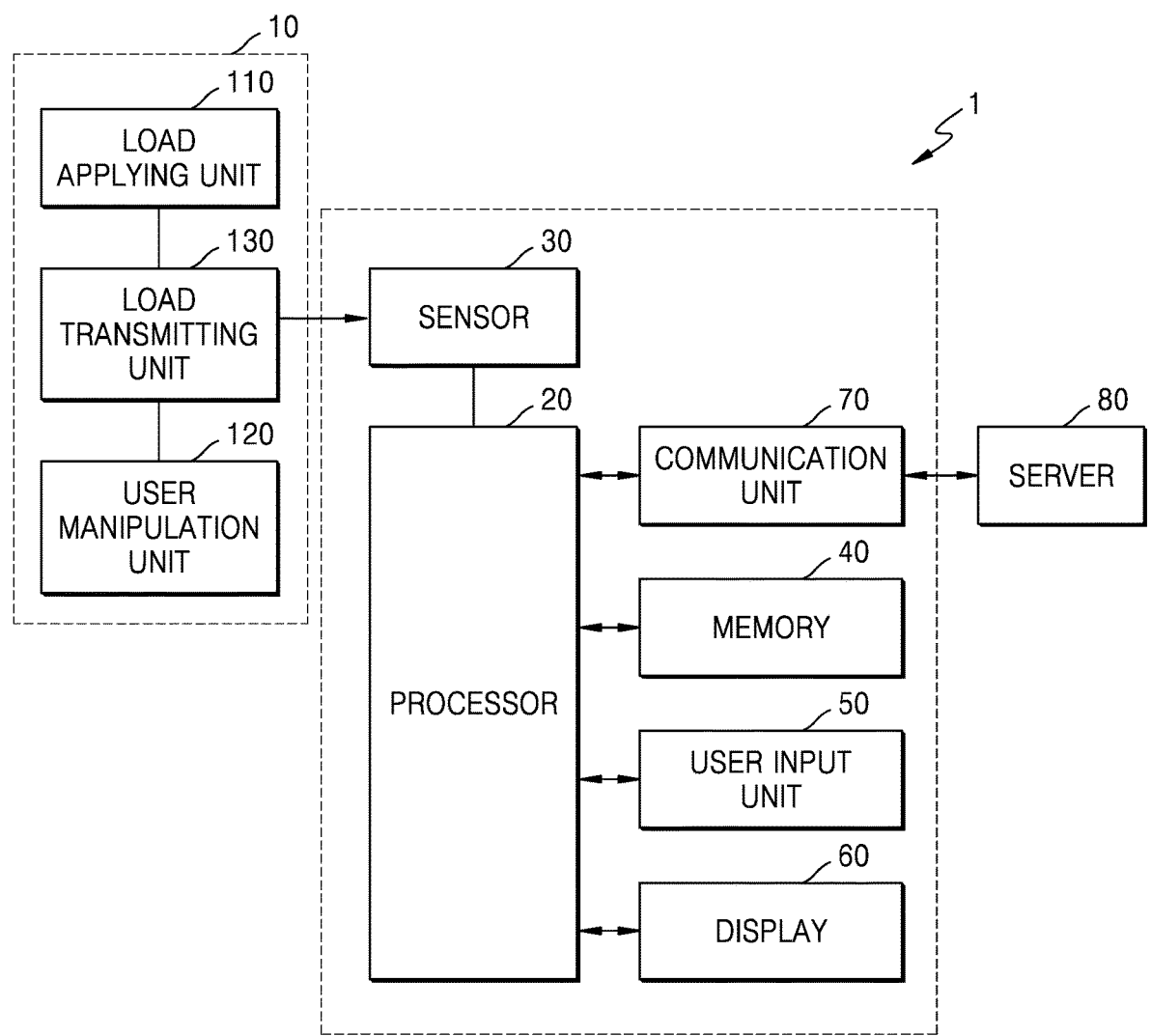

FIGS. 1 and 2 are respectively a perspective view and a block diagram for describing an exercise equipment device 1, according to an embodiment.

Referring to FIGS. 1 and 2, the exercise equipment device 1 according to an example may include an exercise device body 10, a processor 20, a sensor 30, a memory 40, a user input unit 50, and a display 60.

The exercise device body 10 is physical exercise equipment that may apply a load to a user. The exercise device body 10 according to an example may include a load applying unit 110 for adding, reducing, or maintaining a load according to a set exercise level, a user manipulation unit 120, and a load transmitting unit 130.

The load applying unit 110 according to an example may be implemented as a mechanical structure as shown in FIG. 1, and may include a plurality of weight plates 111. In this case, the load applying unit 110 may add, reduce, or maintain a load according to a set exercise level, by adjusting the number of weight plates 111 moving in a certain direction.

However, the present disclosure is not limited thereto, and the load applying unit 110 according to an example may be implemented as an electronic structure. In this case, the load applying unit 110 may include an electric motor, and may add, reduce, or maintain a load according to a control signal applied to the electric motor.

The user manipulation unit 120 according to an example may move together with the user's movement. In the specification, the user manipulation unit 120 may be defined as an arbitrary element that is supported by the user and may move along with the user while the user moves against a load. For example, the user manipulation unit 120 may be implemented as a handle that may be held by the user as shown in FIG. 1. Also, when the exercise equipment device 1 according to an embodiment is for leg exercise, the user manipulation unit 120 may be implemented as a leg support unit that supports and moves along with the user's leg.

Also, the user manipulation unit 120 may move in a certain direction according to the user's movement. The certain direction may be the direction of gravity or a direction opposite to the direction of gravity. However, the certain direction is not limited thereto, and may be inclined with respect to the direction of gravity. For example, the certain direction may be inclined at 45° or less with respect to the direction of gravity and the direction opposite to the direction of gravity. Also, the certain direction may be a clockwise direction or a counter clockwise direction rotating about one axis.

The load transmitting unit 130 according to an example may transmit a load applied by the load applying unit 110 to the user manipulation unit 120. In the specification, the load transmitting unit 130 may be defined as an arbitrary element located between the load applying unit 110 and the user manipulation unit 120 to transmit a load between the load applying unit 110 and the user manipulation unit 120. For example, the load transmitting unit 130 may be implemented as a wire located between the load applying unit 110 and the user manipulation unit 120 and a plurality of pulleys connected to the wire for direction change.

The processor 20 may control at least one element (e.g., hardware or software element) connected to the processor 20 by executing software (e.g., a program), and may perform various data processing or calculations. According to an embodiment, as at least part of the data processing calculations, the processor 20 may load a command or data received from another element (e.g., the sensor 30 or a communication unit 70) into a volatile memory of the memory 40, may process the command or data stored in the volatile memory, and may store resultant data in a nonvolatile memory of the memory 40.

The sensor 30 may be configured to detect movement information of the user manipulation unit 120. For example, the sensor 30 may include a distance detection sensor, for example, a laser sensor, located in the user manipulation unit 120 and a reflection unit located on a fixed support, and may directly detect movement information of the user manipulation unit 120. Also, the sensor 30 according to an example may not only directly detect a movement range of the user manipulation unit 120 but may also indirectly detect a movement range of the user manipulation unit 120 by detecting movements of the load applying unit 110 and the load transmitting unit 130 connected to the user manipulation unit 120. For example, the sensor 30 may be located on a pin structure 112 supported on some of the plurality of weight plates 111, and may detect movements of the plurality of weight plates 111 and thus detect a movement of the user manipulation unit 120 connected to the plurality of weight plates 111. Also, in another example, the sensor 30 may detect a movement of the user manipulation unit 120 connected to the load transmitting unit 130 by detecting movement information of the wire included in the load transmitting unit 130 or detecting rotation information of the pulleys connected to the wire.

The memory 40 may store various data used by at least one element (e.g., the processor 20 or the sensor 30). The data may include, for example, software (e.g., a program), and input data or output data about a command related to the software. The memory 40 may include a volatile memory or a nonvolatile memory. For example, the memory 40 may include an adjustment motion range or a critical motion range which is pre-determined according to user information.

The user input unit 50 may receive a command or data to be used by the exercise equipment device 1 from the outside of the exercise equipment device 1 (e.g., the user). The user input unit 50 may include, for example, a microphone, a mouse, a keyboard, an electronic tag, or a digital pen (e.g., a stylus pen). For example, the user may input user information through the user input unit 50. For example, the user information may include at least one of the user's name, age, gender, height, weight, and exercise experience.

The display 60 may provide output information. The output information according to an example may be user information, user exercise information, or information for guiding the user's exercise. For example, the display 60 may include a screen on which the output information is displayed. Also, the display 60 may be connected to the exercise device body 10 physically or electrically. For example, the display 60 may be provided on a frame structure of the exercise device body 10. However, the present disclosure is not limited thereto, and the display 60 may include a communication unit and, even when being spaced apart from the exercise device body 10, may be connected to receive a certain signal from the exercise device body 10.

The communication unit 70 may perform data communication with the processor 20 and a server 80 described below. In an example, the communication unit 70 codes a user motion range and user information transmitted from the processor 20 and transmits the coded user motion range and the coded user information to the server 80, or transmits code information of the user motion range and the user information that are coded and pre-stored in the server 80 to the processor 20.

The server 80 may store code information received from the processor 20. The code information may be, for example, user information or a user motion range. Also, the server 80 may transmit code information about a program requested by the processor 20 from among pre-stored programs to the processor 20.

In the exercise equipment device 1 according to an embodiment, a state of a user using the exercise equipment device 1 may be different. For example, a user's range of motion (ROM) in which the user may operate the exercise equipment device 1 may vary according to the user's age, gender, height, weight, and exercise experience. A technical feature of automatically setting a user motion range based on user information and movement information of the user manipulation unit 120 will be described.

Figure 3A:
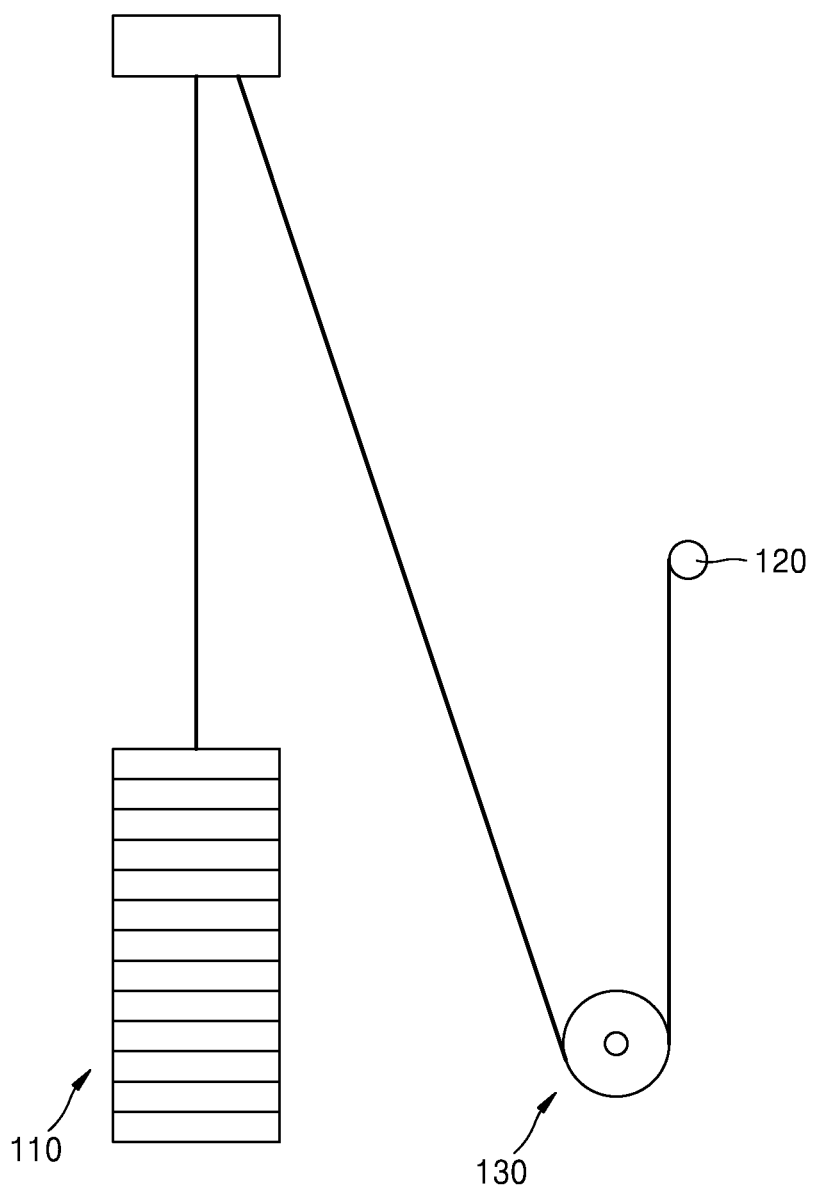
FIGS. 3A to 3C are schematic views illustrating an exercise equipment device that displays a user motion range, according to an embodiment.
Figure 3B:
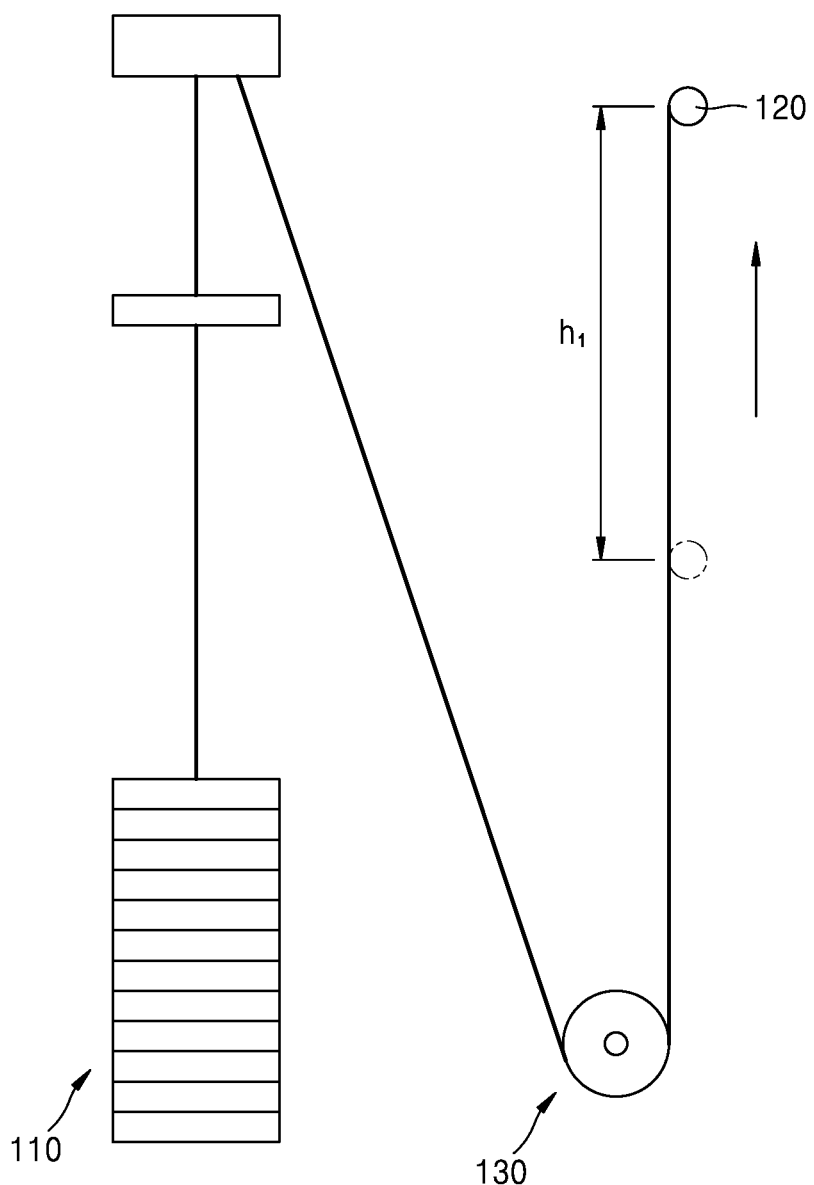
Figure 3C:
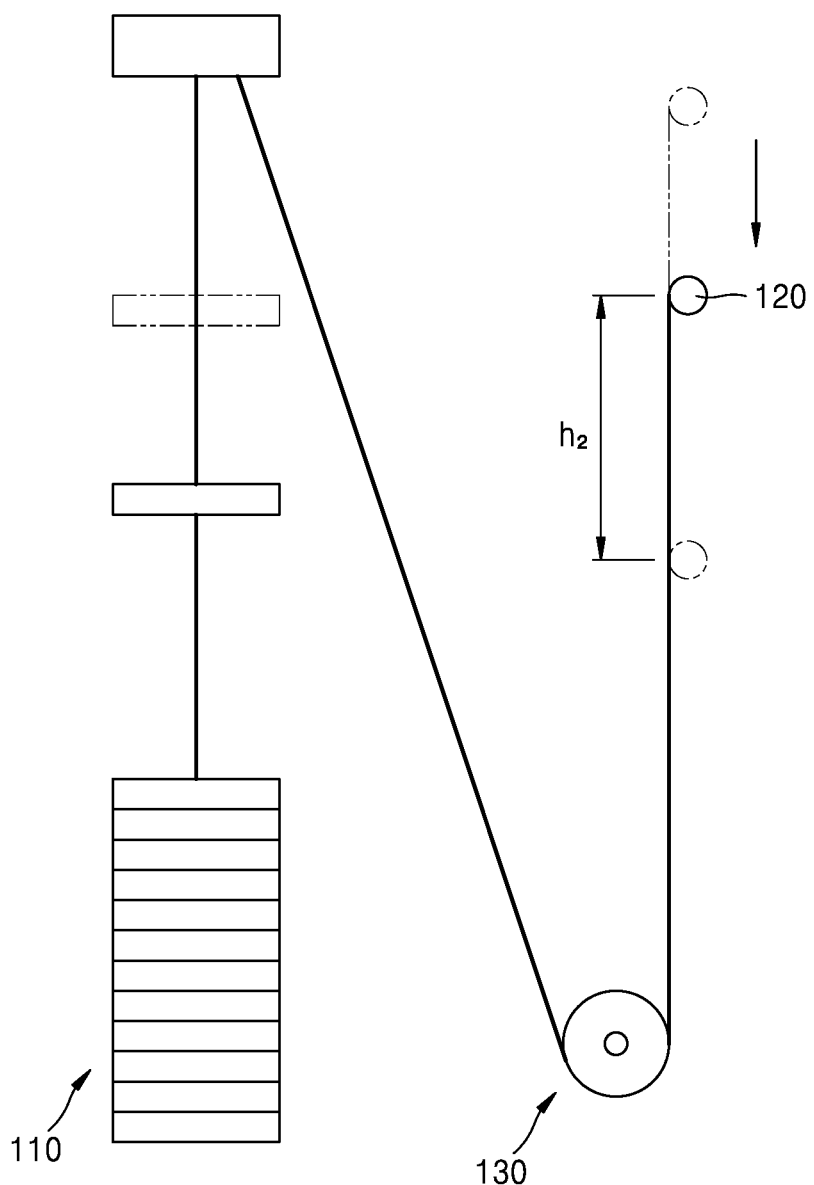
Figure 4:
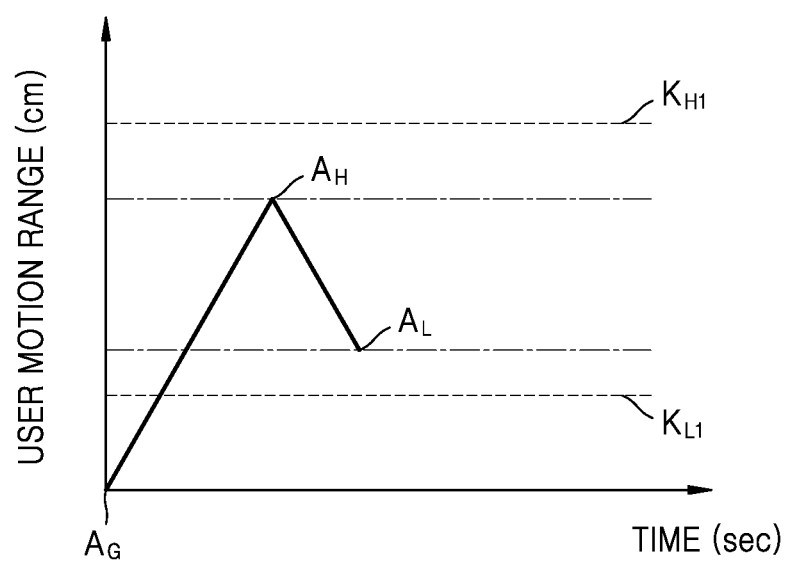
FIG. 4 is a graph illustrating a user motion range according to time and a movement distance, according to FIGS. 3A to 3C.
Figure 5:
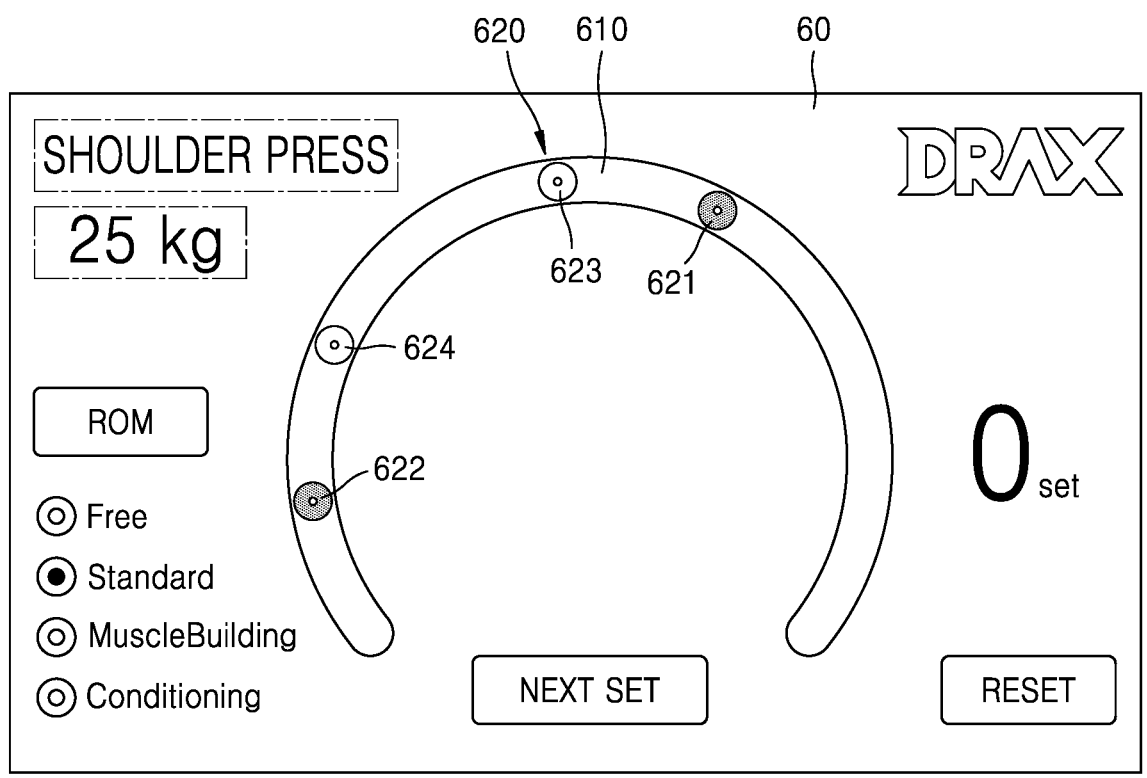
FIG. 5 is view illustrating an output screen of a display, according to an embodiment.

FIGS. 3A to 3C are schematic views illustrating an exercise equipment device that displays a user motion range, according to an embodiment. FIG. 4 is a graph illustrating a user motion range according to time and a movement distance, according to FIGS. 3A to 3C. FIG. 5 is a view illustrating an output screen of a display, according to an embodiment.

Referring to FIGS. 3A and 4, in a first state in which a user does not operate the exercise equipment device 1 according to an example, the user manipulation unit 120 may be fixed at a reference position $A_G$. For example, when the user does not operate the exercise equipment device 1, the user manipulation unit 120 may be affected by gravity due to the load applying unit 110, but may be fixed at a certain position by a certain locking device (not shown). In this case, as shown in FIG. 4, the user manipulation unit 120 may be located at a lowermost position in the reference position $A_G$.

Referring to FIGS. 3B, 4, and 5, in a second state in which the user operates the exercise equipment device 1 according to an example, the user may move the user manipulation unit 120 upward. In this case, the user may spread his/her arms holding the user manipulation unit 120 by using a maximum force that the user may generate. Accordingly, the user manipulation unit 120 held by the user may also move upward. A state in which the user manipulation unit 120 maximally moves in one direction from a state, that is, the first state, in which the user manipulation unit 120 is stopped may be defined as an upper limit movement range $A_H$. According to an example, as shown in FIG. 4, the user manipulation unit 120 may be located at a highest position in the upper limit movement range $A_H$.

According to an example, the upper limit movement range $A_H$ according to a movement of the user manipulation unit 120 may be determined within a first critical motion range $K_1$. The first critical motion range $K_1$ is determined by user information, and includes a first critical motion upper limit $K_{H1}$ and a first critical motion lower limit $K_{L1}$ with respect to the user manipulation unit 120. For example, the first critical motion range $K_1$ may be pre-set by user information input through the user input unit 50, for example, at least one of the user's age, gender, height, weight, and exercise experience.

According to an example, the first critical motion range $K_1$ may be determined by averaging exercise histories of a plurality of users in their 20s, and the first critical motion range $K_1$ may be determined by averaging exercise histories of a plurality of users in their 60s. In this case, the first critical motion range $K_1$ of the users in their 20s may be set to be wider than the first critical motion range $K_1$ of the users in their 60s. That is, the first critical motion upper limit $K_{H1}$ of the users in their 20s may be higher than the first critical motion upper limit $K_{H1}$ of the users in their 60s, and the first critical motion lower limit $K_{L1}$ of the users in their 20s may be lower than the first critical motion lower limit $K_{L1}$ of the users in their 60s. Accordingly, the first critical motion range $K_1$ according to age may be determined, and when a user inputs his/her age through the user input unit 50, the first critical motion range $K_1$ may be automatically set. The first critical motion range $K_1$ according to gender, height, weight, and exercise experience may also be set in the same manner as that according to age. Also, the first critical motion range $K_1$ according to a combination of the user's age, gender, height, weight, and exercise experience may also be set. The first critical motion range $K_1$ according to the user's age, gender, height, weight, and exercise experience may be stored in the memory 40.

The processor 20 may determine a first user motion range based on the user information and the upper limit movement range $A_H$ of the user manipulation unit 120 detected by the sensor 30. For example, the sensor 30 may detect a first distance $h_1$ moved by the user manipulation unit 120 from the first state to the second state, and may transmit the first distance $h_1$ to the processor 20. In this case, the processor 20 may retrieve the first critical motion upper limit $K_{H1}$ stored in the memory 40. The processor 20 may determine whether the upper limit movement range $A_H$ exceeds the first critical motion upper limit $K_{H1}$ determined based on the user information, and when the upper limit movement range $A_H$ does not exceed the first critical motion upper limit $K_H$, the processor 20 may determine a position of the user manipulation unit 120 in the second state, as the upper limit movement range $A_H$, that is, a first user motion range.

As shown in FIG. 5, the processor 20 may control the display 60 to display the upper limit movement range $A_H$ of the user manipulation unit 120 and the first user motion range determined based on the user information. For example, the display 60 may include a track 610 for displaying a movement path according to a movement of the user manipulation unit 120 and a pointer 620 moving along the track 610. The track 610 according to an example may have an arbitrary curved or straight shape extending in one direction. The pointer 620 may be implemented as any indicator that may move along the track 610.

The processor 20 may control the display 60 to display a first pointer 621 corresponding to the first critical motion upper limit $K_{H1}$ stored in the memory 40 on the track 610. In this case, a position of the first pointer 621 is fixed on the track 610. A third pointer 623 may move in one direction according to a movement of the user manipulation unit 120 detected by the sensor 30. In this case, when the upper limit movement range $A_H$ is determined by the processor 20 as described above, a position of the third pointer 623 may be displayed as an upper limit range of the first user motion range.

Referring to FIGS. 3C, 4, and 5, the user may switch the exercise equipment device 1 from the second state to a third state according to an example. In this case, the user may move the user manipulation unit 120 downward. For example, the user may move the user manipulation unit 120 located in the upper limit movement range $A_H$ downward by adjusting the force of his/her arms. The third state in which the user manipulation unit 120 maximally moves in another direction from a state, that is, the second state, in which the user manipulation unit 120 is stopped may be defined as a lower limit movement range $A_L$. According to an example, as shown in FIG. 4, the lower limit movement range $A_L$ may be located between the upper limit movement range $A_H$ and the reference position $A_1$.

According to an example, the lower limit movement range $A_L$ according to a movement of the user manipulation unit 120 may be determined in the first critical motion range $K_1$. A method of setting the first critical motion lower limit $K_{L1}$ included in the first critical motion range $K_1$ by using the user information is substantially the same as a method of setting the first critical motion upper limit $K_{H1}$, and thus, a repeated description thereof will be omitted.

The processor 20 may determine the first user motion range based on the user information and the lower limit movement range $A_L$ of the user manipulation unit 120 detected by the sensor 30. In an example, the sensor 30 may detect a second distance $h_2$ moved by the user manipulation unit 120 moves from the second state to the third state, and may transmit the second distance $h_2$ to the processor 20. In this case, the processor 20 may retrieve the first critical motion lower limit $K_{L1}$ stored in the memory 40. The processor 20 may determine whether the lower limit movement range $A_L$ is less than the first critical motion lower limit $K_{L1}$ determined based on the user information, and when the lower limit movement range $A_L$ exceeds the first critical motion lower limit $K_{L1}$, the processor 20 may determine a position of the user manipulation unit 120 in the third state as the lower limit movement range $A_L$, that is, the first user motion range.

As shown in FIG. 5, the processor 20 may control the display 60 to display the lower limit movement range $A_L$ of the user manipulation unit 120 and the first user motion range determined based on the user information.

The processor 20 may control the display 60 to display a second pointer 622 corresponding to the first critical motion lower limit $K_{L1}$ stored in the memory 40 on the track. In this case, a position of the second pointer 622 is fixed on the track 610. A fourth pointer 624 may move in one direction according to a movement of the user manipulation unit 120 detected by the sensor 30. In this case, when the lower limit movement range $A_L$ is determined by the processor 20 as described above, a position of the fourth pointer 624 may be displayed as a lower limit range of the first user motion range.

In addition to a method of determining a first user motion range based on user information and movement information of the user manipulation unit 120 detected by the sensor 30, a method of adjusting the first user motion range based on the user information or responding to wrong movement information of the user manipulation unit 120 will be described.

Figure 6:
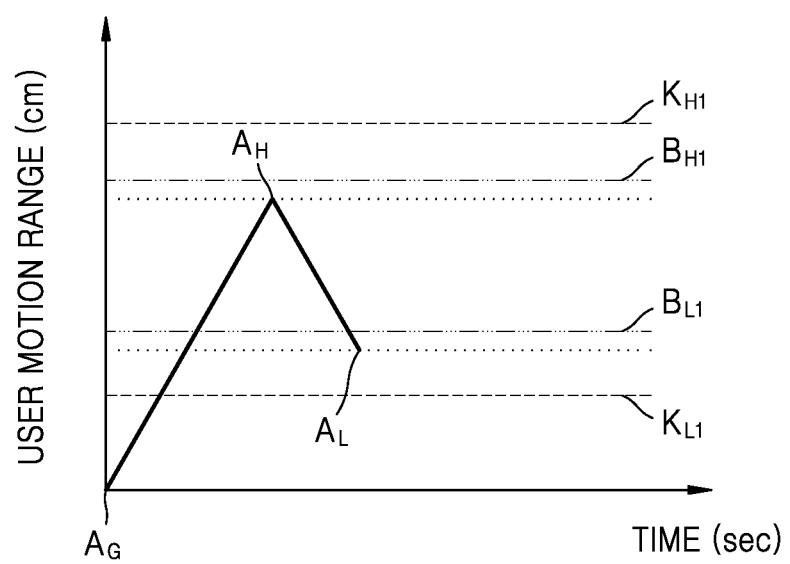
FIG. 6 is a graph illustrating a user motion range according to time and a movement distance, according to an embodiment.

FIG. 6 is a graph illustrating a user motion range according to time and a movement distance, according to an embodiment.

Referring to FIGS. 4 and 6, the first critical motion range $K_1$ according to an example may be determined by user information. In this case, the first critical motion range may be pre-set by user information input through the user input unit 50, for example, at least one of a user's age, gender, height, weight, and exercise experience. However, the first critical motion range $K_1$ only means a critical range where the upper limit movement range $A_H$ and the lower limit movement range $A_L$ may be effective, but the upper limit movement range $A_H$ and the lower limit movement range $A_L$ detected by the sensor 30 are not corrected.

According to an example, the processor 210 may determine an upper limit range of a first user motion range based on the upper limit movement range $A_H$ and the lower limit movement range $A_L$ detected by the sensor 30, and a first adjustment motion range $B_1$ set by using the user information input through the user input unit 50, for example, at least one of the user's age, gender, height, weight, and exercise experience.

For example, the first adjustment motion range $B_1$ may be determined by averaging exercise histories of a plurality of users according to age. Accordingly, when the user inputs his/her age through the user input unit 50, the first adjustment motion range $B_1$ may be automatically set. The first adjustment motion range $B_1$ according to gender, height, weight, and exercise experience may also be set in the same manner as that according to age. Also, the first adjustment motion range $B_1$ according to a combination of the user's age, gender, height, weight, and exercise experience may also be set. The first adjustment motion range $B_1$ according to the user's age, gender, height, weight, and exercise experience may be stored in the memory 40.

The processor 20 may determine the first user motion range based on the first adjustment motion range $B_1$ and the upper limit movement range $A_H$ and the lower limit movement range $A_L$ of the user manipulation unit 120 detected by the sensor 30. For example, when the upper limit movement range $A_H$ and the lower limit movement range $A_L$ of the user manipulation unit 120 are determined by the sensor 30, the processor 20 may retrieve the first adjustment motion range $B_1$, more specifically, a first adjustment motion upper limit range $B_{H1}$ and a first adjustment motion lower limit range $B_{L1}$.

For example, the processor 20 may determine an upper limit range of a first user range in an intermediate range between the upper limit movement range $A_H$ and the first adjustment motion upper limit range $B_{H1}$ based on the upper limit movement range $A_H$ and the first adjustment motion upper limit range $B_{H1}$. However, the present disclosure is not limited thereto, and the upper limit range of the first user range may be determined by adding weights to the upper limit movement range $A_H$ and the first adjustment motion upper limit range $B_{H1}$. For example, when user information input through the user input unit 50 is small, for example, when only gender and age are input, a weight of the upper limit movement range $A_H$ may be increased. Also, when user information input through the user input unit 50 is large, for example, when age, gender, height, weight, and exercise experience are input, a weight of the first adjustment motion upper limit range $B_{H1}$ may be increased.

Also, the processor 20 may determine the first user range based on the lower limit movement range $A_L$ and the first adjustment motion lower limit range $B_{L1}$. A method of determining a lower limit range of the first user range by using the lower limit movement range $A_L$ and the first adjustment motion lower limit range $B_{L1}$ is substantially the same as a method of determining the upper limit range of the first user range based on the upper limit movement range $A_H$ and the first adjustment motion upper limit range $B_{H1}$, and thus, a repeated description thereof will be omitted. As described above, a more accurate first user range may be determined by adding a correction value using user information to a measurement value using the sensor 30.

Figure 7A:
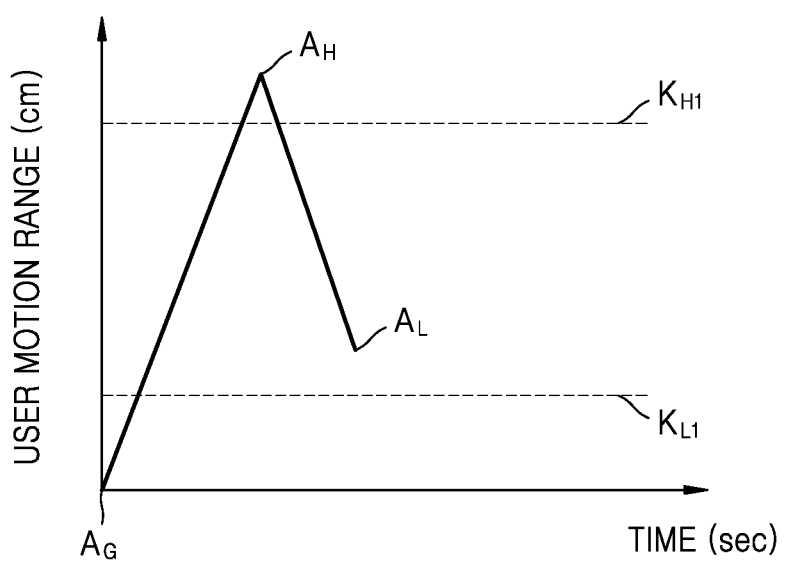
FIG. 7A is a graph illustrating a user motion range according to time and a movement distance, according to another embodiment.
Figure 7B:
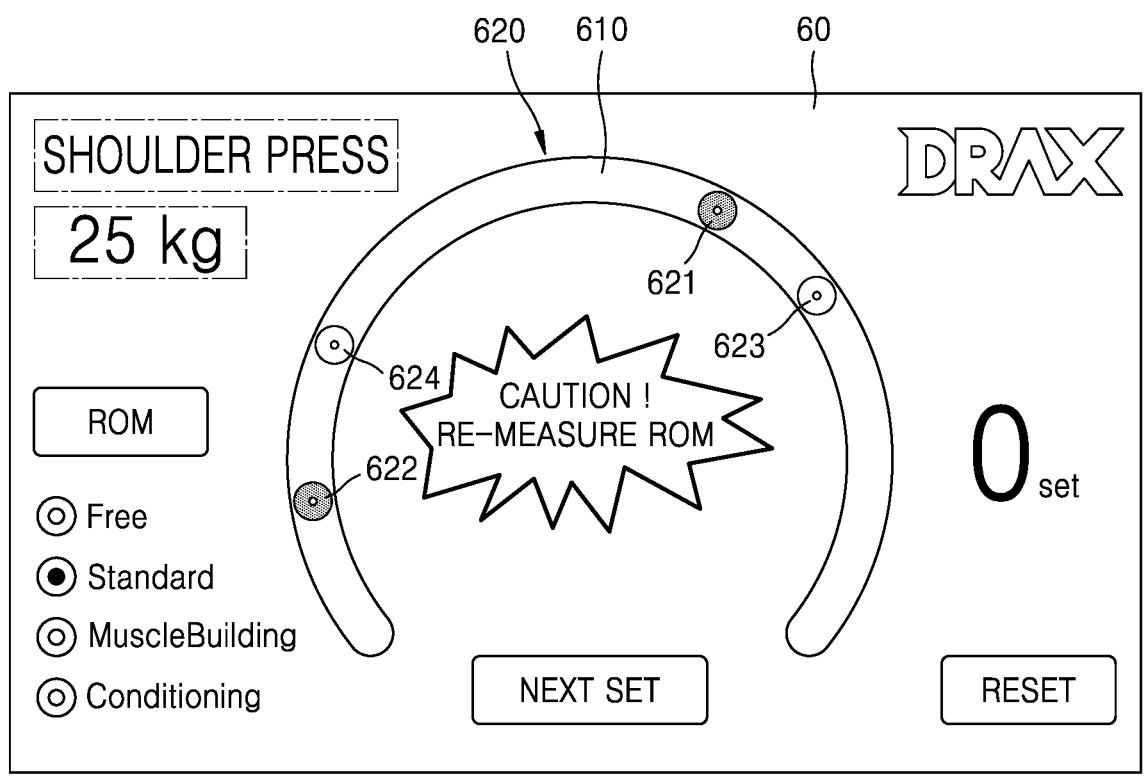
FIG. 7B is a view illustrating an output screen of a display, according to an embodiment.

FIG. 7A is a graph illustrating a user motion range according to time and a movement distance, according to another embodiment. FIG. 7B is a view illustrating an output screen of a display, according to an embodiment.

As described with reference to FIG. 4, the upper limit movement range $A_H$ and the lower limit movement range $A_L$ according to a movement of the user manipulation unit 120 may be determined within the first critical motion range $K_1$. However, due to a user's manipulation error or the like, at least one of the upper limit movement range $A_H$ and the lower limit movement range $A_L$ may be outside the first critical motion range $K_1$.

Referring to FIGS. 7A and 7B, the upper limit movement range $A_H$ according to a movement of the user manipulation unit 120 may exceed the first critical motion upper limit $K_{H1}$. In this case, a position of a third pointer 623 displayed on the display 60 may move beyond a position of the first pointer 621 corresponding to the first critical motion lower limit $K_{H1}$. Accordingly, the processor 20 may determine an erroneous exercise state of the user. Also, the processor 20 may control the display 60 to display a warning signal and a re-measurement signal.

According to an example, when the warning signal and the re-measurement signal are displayed on the display 60, the user may move the user manipulation unit 120 by modifying the exercise state. Accordingly, the sensor 30 may secure the corrected upper limit movement range $A_H$ and the corrected lower limit movement range $A_L$.

However, because physical characteristics of users are not the same, at least one of the upper limit movement range $A_H$ and the lower limit movement range $A_L$ may be repeatedly outside the first critical motion range K1. According to an embodiment, when the upper limit movement range $A_H$ and the lower limit movement range $A_L$ are outside the first critical motion range $K_1$ repeatedly two or more times, the processor 20 may determine that the upper limit movement range $A_H$ and the lower limit movement range $A_L$ measured through the sensor 30 are a first user motion range.

In the above embodiments, a case where the user manipulation unit 120 reciprocates once to determine a first user motion range has been described. A second user motion range that may be determined when the user manipulation unit 120 reciprocates multiple times will be described.

Figure 8:
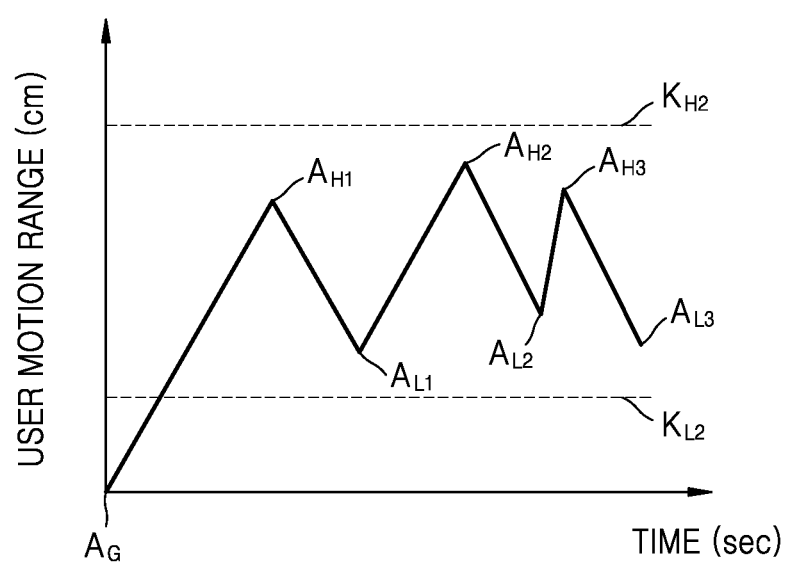
FIGS. 8 and 9 are graphs illustrating a user motion range according to time and a movement distance, according to another embodiment.
Figure 9:
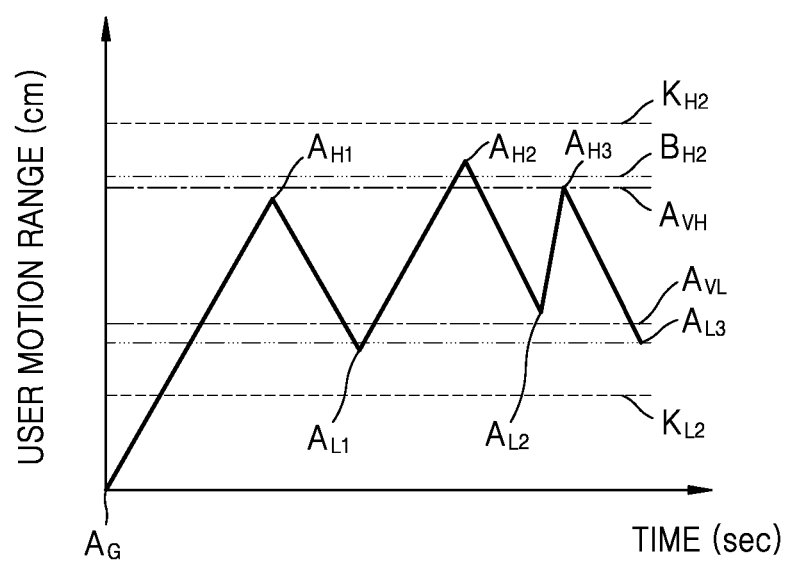

FIGS. 8 and 9 are graphs illustrating a user motion range according to time and a movement distance, according to another embodiment.

Referring to FIGS. 8 and 9, the processor 20 according to an embodiment may determine a second user motion range based on movement information of the user manipulation unit 120 detected by using the sensor 30 and user information input through the user input unit 50. The description of a plurality of upper limit movement ranges $A_{H1}$, $A_{H2}$, and $A_{H3}$ and a plurality of lower limit movement ranges $A_{L1}$, $A_{L2}$, and $A_{L3}$, and a second critical motion upper limit $K_{H2}$ and a second critical motion lower limit $K_{L2}$ included in a second critical motion range $K_2$ is substantially the same as that of the upper limit movement range $A_H$ and the lower limit movement range $A_L$, and the first critical motion upper limit $K_{H1}$ and the first critical motion lower limit $K_{L1}$ included in the first critical motion range $K_1$ of FIGS. 3A to 4, and thus, a repeated description will be omitted.

According to an embodiment, a user performs multiple reciprocating motions, for example, three reciprocating motions, by using the user manipulation unit 120. In this case, the processor 20 may receive data related to the plurality of upper limit movement ranges $A_{H1}$, $A_{H2}$, and $A_{H3}$ and the plurality of lower limit movement ranges $A_{L1}$, $A_{L2}$, and $A_{L3}$ by using the sensor 30. The processor 20 may determine an upper limit average movement range $A_{VH}$ by calculating an average value of the plurality of upper limit movement ranges $A_{H1}$, $A_{H2}$, and $A_{H3}$, and may determine a lower limit average movement range $A_{VL}$ by calculating an average value of the plurality of lower limit movement ranges $A_{L1}$, $A_{L2}$, and $A_{L3}$, to determine a second user motion range including the upper limit average movement range $A_{VH}$ and the lower limit average movement range $A_{VL}$.

Although the upper limit average movement range $A_{VH}$ and the lower limit average movement range $A_{VL}$ are determined by using the average values of the plurality of upper limit movement ranges $A_{H1}$, $A_{H2}$, and $A_{H3}$ and the plurality of lower limit movement ranges $A_{L1}$, $A_{L2}$, and $A_{L3}$ in the above embodiment, the present disclosure is not limited thereto, and the upper limit average movement range $A_{VH}$ and the lower limit average movement range $A_{VL}$ may be determined by differently calculating the plurality of upper limit movement ranges $A_{H1}$, $A_{H2}$, and $A_{H3}$ and the plurality of lower limit movement ranges $A_{L1}$, $A_{L2}$, and $A_{L3}$. For example, the processor 20 may determine the upper limit average movement range $A_{VH}$ and the lower limit average movement range $A_{VL}$ by normalizing the plurality of upper limit movement ranges $A_{H1}$, $A_{H2}$, and $A_{H3}$ and the plurality of lower limit movement ranges $A_{L1}$, $A_{L2}$, and $A_{L3}$.

Also, the processor 20 may determine a second user motion range based on the upper limit average movement range $A_{VH}$ and the lower limit average movement range $A_{VL}$, and a second adjustment motion range $B_2$. For example, when the upper limit average movement range $A_{VH}$ and the lower limit average movement range $A_{VL}$ are determined by detection of the sensor 30, the processor 20 may retrieve the second adjustment motion range $B_2$ stored in the memory 40, more specifically, a second adjustment motion upper limit range $B_{H2}$ and a second adjustment motion lower limit range $B_{L2}$. A method of determining the second adjustment motion range $B_2$ is substantially the same as that of the first adjustment motion range $B_1$, and thus, a repeated description will be omitted.

For example, the processor 20 may determine a second user range in an intermediate range between the upper limit average movement range $A_{VH}$ and the second adjustment motion upper limit range $B_{H2}$ based on the upper limit average movement range $A_{VH}$ and the second adjustment motion upper limit range $B_{H2}$. However, the present disclosure is not limited thereto, and the processor 20 may determine an upper limit range of a second user range by adding weights to the upper limit average movement range $A_{VH}$ and the second adjustment motion upper limit range $B_{H2}$.

Also, the processor 20 may determine a second user range in an intermediate range between the lower limit average movement range $A_{VL}$ and the second adjustment motion upper limit range $B_{L2}$ based on the lower limit average movement range $A_{VL}$ and the second adjustment motion upper limit range $B_{L2}$. However, the present disclosure is not limited thereto, and the processor 20 may determine a lower limit range of a second user range by adding weights to the lower limit average movement range $A_{VL}$ and the second adjustment motion upper limit range $B_{L2}$.

Figure 10A:
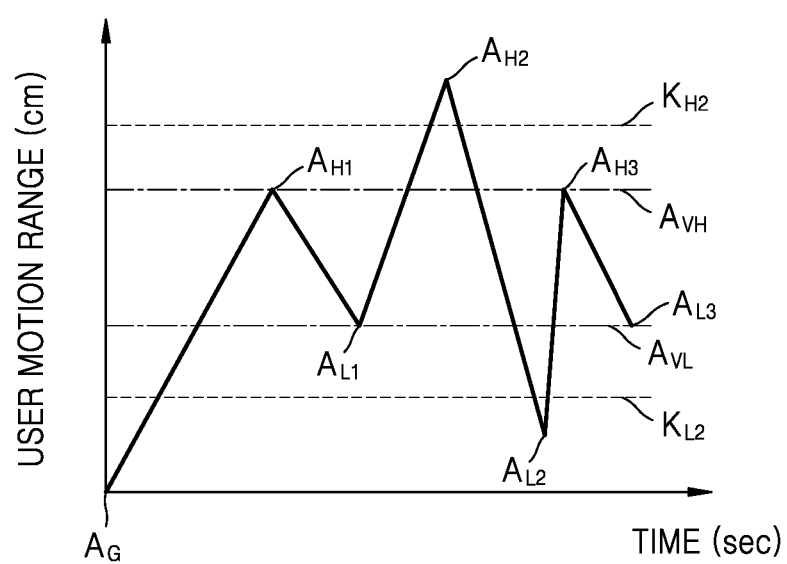
FIGS. 10A and 10B are graphs illustrating a user motion range according to time and a movement distance, according to another embodiment.
Figure 10B:
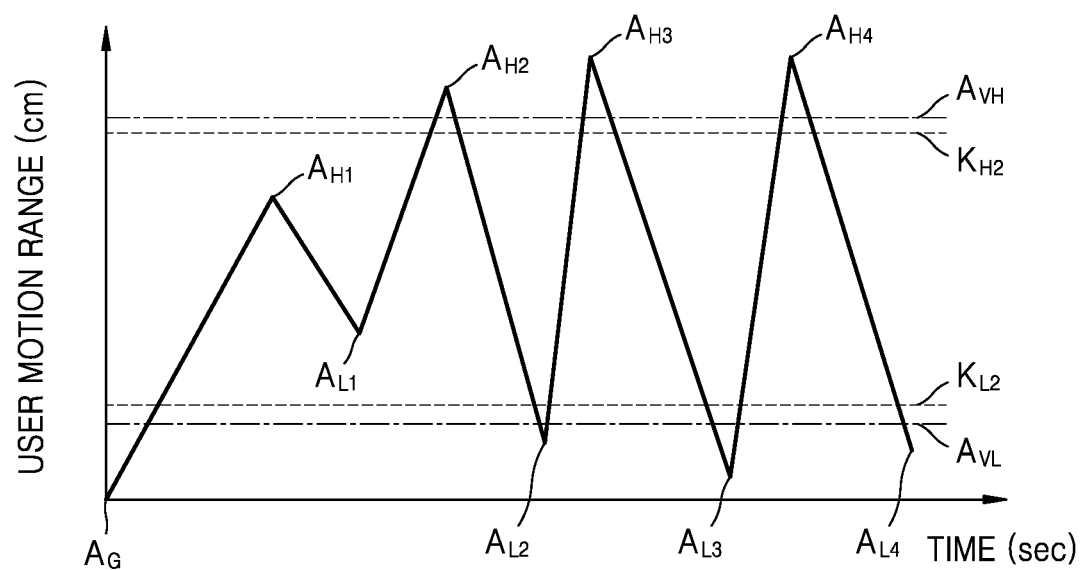

FIGS. 10A and 10B are graphs illustrating a user motion range according to time and a movement distance, according to another embodiment.

As described with reference to FIGS. 8 and 9, the plurality of upper limit movement ranges $A_{H1}$, $A_{H2}$, and $A_{H3}$ and the plurality of lower limit movement ranges $A_{L1}$, $A_{L2}$, and $A_{L3}$ according to a movement of the user manipulation unit 120 may be determined within the second critical motion range $K_2$. However, at least one of the plurality of upper limit movement ranges $A_{H1}$, $A_{H2}$, and $A_{H3}$ and the plurality of lower limit movement ranges $A_{L1}$, $A_{L2}$, and $A_{L3}$ may be outside the second critical motion range $K_2$ due to the user's manipulation error or the like.

Referring to FIGS. 10A and 10B, at least one of the plurality of upper limit movement ranges $A_{H1}$, $A_{H2}$, and $A_{H3}$ according to a movement or the user manipulation unit 120 may exceed the second critical motion upper limit $K_{H2}$. According to an example, when the second upper limit movement range $A_{H2}$ exceeds the second critical motion upper limit $K_{H2}$, the processor 20 may determine the upper limit average movement range $A_{VH}$ by using data other than the second upper limit movement range $A_{H2}$ exceeding the second critical motion upper limit $K_{H2}$. Accordingly, the processor 20 may determine a more accurate upper limit average movement range $A_{VH}$, by removing data obtained by a user's manipulation error. A method of determining the lower limit average movement range $A_{VL}$ by using the plurality of lower limit movement ranges $A_{L1}$, $A_{L2}$, and $A_{L3}$ is substantially the same.

However, because physical characteristics of users are not the same, at least one of the plurality of upper limit movement ranges $A_{H1}$, $A_{H2}$, and $A_{H3}$ and the plurality of lower limit movement ranges $A_{L1}$, $A_{L2}$, and $A_{L3}$ may be repeatedly outside the second critical motion range $K_2$. According to an embodiment, when the plurality of upper limit movement ranges $A_{H1}$, $A_{H2}$, and $A_{H3}$ and the plurality of lower limit movement ranges $A_{L1}$, $A_{L2}$, and $A_{L3}$ are outside the second critical motion range $K_2$ repeatedly three or more times, the processor 20 may determine the upper limit average movement range $A_{VH}$ and the lower limit average movement range $A_{VL}$, that is, a second user motion range, including the plurality of upper limit movement ranges $A_{H1}$, $A_{H2}$, and $A_{H3}$ and the plurality of lower limit movement ranges $A_{L1}$, $A_{L2}$, and $A_{L3}$ which are outside the second critical motion range $K_2$.

The exercise equipment device 1 for determining a user motion range according to one exercise has been described in the above embodiment. However, the user may exercise on different days as well as on the same day, and a user motion range may vary according to the user's health condition. The exercise equipment device 1 for updating a change in a user motion range according a user's health condition will be described.

Figure 11A:
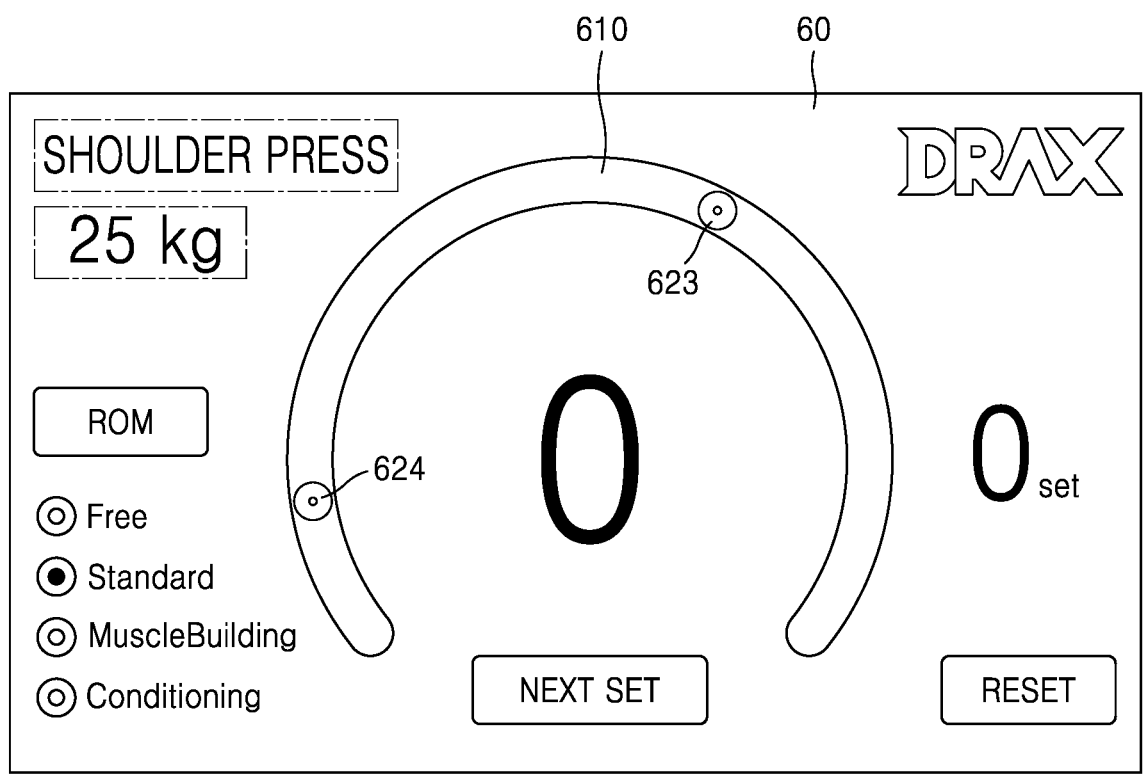
FIG. 11A is a graph illustrating a user motion range according to time and a movement distance, according to another embodiment.
Figure 11B:
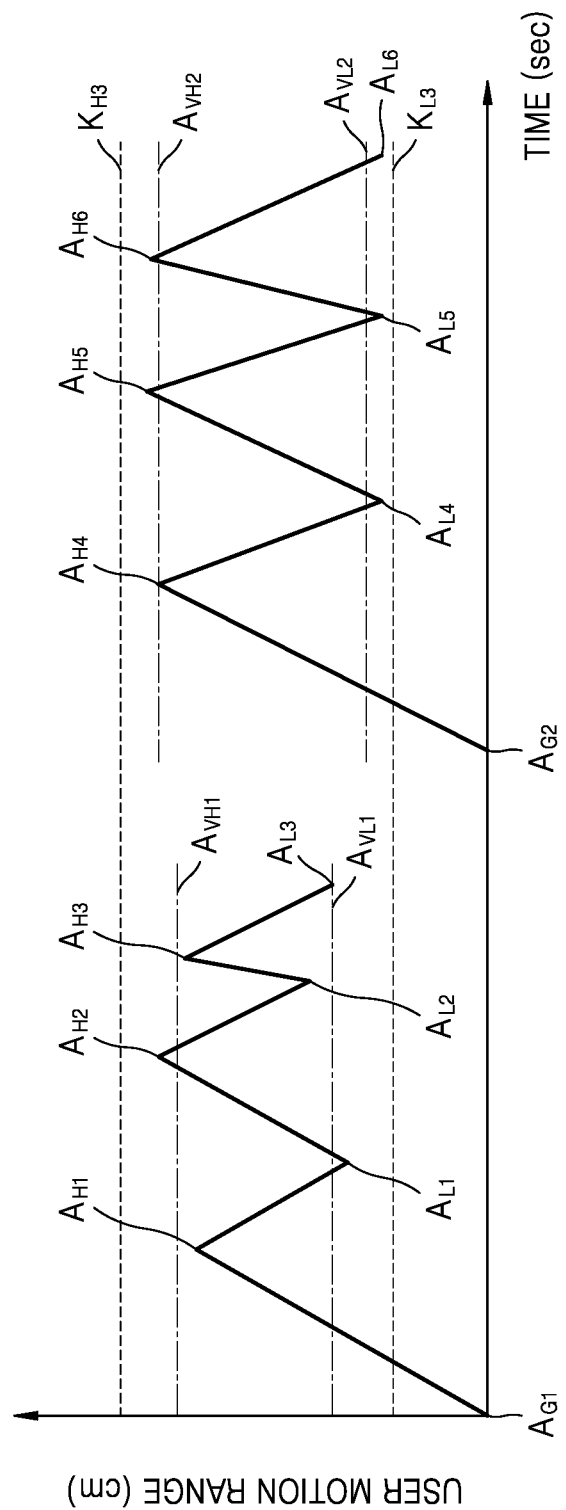
FIG. 11B is a graph illustrating an output screen of a display, according to another embodiment.
Figure 11C:
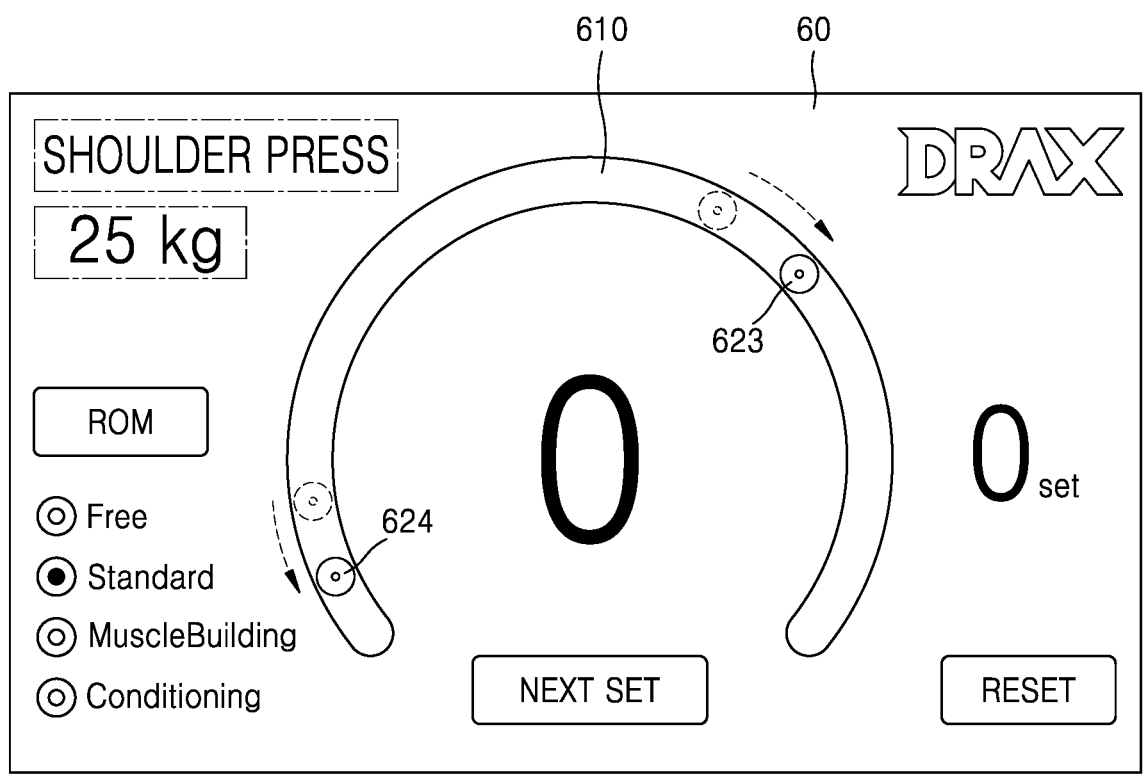
FIG. 11C is a graph illustrating an output screen of a display, according to another embodiment.

FIG. 11A is a graph illustrating a user motion range according to time and a movement distance, according to another embodiment. FIG. 11B is a graph illustrating an output screen of a display, according to another embodiment. FIG. 11C is a graph illustrating an output screen of a display, according to another embodiment.

Referring to FIGS. 11A to 11C, the processor 20 according to an embodiment may determine a third user motion range based on movement information of the user manipulation unit 20 detected by using the sensor 30 and user information input through the user input unit 50. The description of a plurality of upper limit movement ranges $A_{H1}$, $A_{H2}$, $A_{H3}$, $A_{H4}$, $A_{H5}$, and $A_{H6}$ and a plurality of lower limit movement ranges $A_{L1}$, $A_{L2}$, $A_{L3}$, $A_{L4}$, $A_{L5}$, and $A_{L6}$, and a third critical motion upper limit $K_{H3}$ and a third critical motion lower limit $K_{L3}$ included in a third critical motion range $K_3$ is substantially the same as that of the upper limit movement range $A_H$ and the lower limit movement range $A_L$ and the first critical motion upper limit $K_{H1}$ and the first critical motion lower limit $K_{K1}$ included in the first critical motion range $K_1$ of FIGS. 3A to 4, and thus, a repeated description will be omitted.

According to an embodiment, in a first round, a user performs multiple reciprocating motions, for example, three reciprocating motions, by using the user manipulation unit 120. Here, an $n^{th}$ round refers to an $n^{th}$ exercise that is performed again after a time break such as at a different time on the same day, or on a different day. In this case, the processor 20 may receive data related to the plurality of upper limit movement ranges $A_{H1}$, $A_{H2}$, and $A_{H3}$ according to the first round and the plurality of lower limit movement ranges $A_{L1}$, $A_{L2}$, and $A_{L3}$ according to the first round by using the sensor 30. The processor 20 may determine a first upper limit average movement range $A_{VH1}$ by calculating an average value of the plurality of upper limit movement ranges $A_{H1}$, $A_{H2}$, and $A_{H3}$ according to the first round, and may determine a first lower limit average movement range $A_{VL1}$ by calculating an average value of the plurality of lower limit movement ranges $A_{L1}$, $A_{L2}$, and $A_{L3}$ according to the first round, to determine a third user motion range including the first upper limit average movement range $A_{VH1}$ and the first lower limit average movement range $A_{VL1}$. A method of determining a third user motion range by using the plurality of upper limit movement ranges $A_{H1}$, $A_{H2}$, and $A_{H3}$ according to the first round and the plurality of lower limit movement ranges $A_{L1}$, $A_{L2}$, and $A_{L3}$ according to the first round is substantially the same as that of a second user motion range including the upper limit average movement range $A_{VH}$ and the lower limit average movement range $A_{VL}$ of FIG. 9, and thus, a repeated description will be omitted.

The communication unit 70 may transmit the third user motion range including the first upper limit average movement range $A_{VH1}$ and the first lower limit average movement range $A_{VL1}$ determined by the processor 20 to the server 80. In this case, the server 80 may store the third user motion range based on received time and user information, for example, user identification information.

However, the present disclosure is not limited thereto, and in another embodiment, the third user motion range may be stored in the memory 40. For example, the third user motion range may be identified according to the user information. The third user motion range identified according to the user information may be stored in the memory 40. In this case, the server 80 located outside and the communication unit 70 for communicating with the server 80 may not be required.

When the user starts a second round, the processor 20 may control the communication unit 70 to receive the third user motion range that is pre-stored from the server 80, based on the user information input to the user input unit 50. In this case, the processor 20 may control the display 60 to display the third user motion range. For example, as shown in FIG. 11B, the third user motion range may be displayed by the third pointer 623 and the fourth pointer 624 on the track 610. In this case, the third pointer 623 and the fourth pointer 624 may respectively correspond to the first upper limit average movement range $A_{VH1}$ and the first lower limit average movement range $A_{VL1}$.

However, the present disclosure is not limited thereto, and in another embodiment, when the user starts the second round, the processor 20 may receive the third user motion range that is pre-stored from the memory 40, based on the user information input to the user input unit 50. In this case, the processor 20 may control the display 60 to display the third user motion range. Next, in the second round, the user performs multiple reciprocating motions, for example, three reciprocating motions, by using the user manipulation unit 120. In this case, the processor 20 may receive data related to the plurality of upper limit movement ranges $A_{H4}$, $A_{H5}$, and $A_{H6}$ according to the second round and the plurality of lower limit movement ranges $A_{L4}$, $A_{L5}$, and $A_{L6}$ according to the second round by using the sensor 30. In this case, the processor 20 may determine a 3-1th user motion range based on the third user motion range according to the first round, that is, the first upper limit average movement range $A_{VH1}$ and the first lower limit average movement range and the plurality of upper limit movement ranges $A_{H4}$, $A_{H5}$, and $A_{H6}$ according to the second round and the plurality of lower limit movement ranges $A_{L4}$, $A_{L5}$, and $A_{L6}$ according to the second round. For example, the processor 20 may determine a second upper limit average movement range $A_{VH2}$ by adding an average value of the plurality of upper limit movement ranges $A_{H4}$, $A_{H5}$, and $A_{H6}$ to the first upper limit average movement range $A_{VH1}$. Also, the processor 20 may determine a second lower limit average movement range $A_{VL2}$ by adding an average value of the plurality of lower limit movement ranges $A_{L4}$, $A_{L5}$, and $A_{L6}$ to the first lower limit average movement range $A_{VL1}$. In this case, the processor 20 may control the display 60 to display the 3-1th user motion range. For example, as shown in FIG. 11C, the third pointer 623 and the fourth pointer 624 displayed on the track 610 may move according to the second upper limit average movement range $A_{VH2}$ and the second lower limit average movement range $A_{VL2}$.

The processor 20 may control the communication unit 70 to transmit the newly updated 3-1$^{th}$ user motion range, that is, the second upper limit average movement range $A_{VH2}$ and the second lower limit average movement range $A_{VL2}$ to the server 80. In this case, the processor 20 may control the communication unit 70 to transmit updated time and user identification information along with the 3-1$^{th}$ user motion range to the server 80.

However, the present disclosure is not limited thereto, and in another embodiment, the processor 20 may store the newly updated 3-1$^{th}$ user motion range, that is, the second upper limit average movement range $A_{VH2}$ and the second lower limit average movement range $A_{VL2}$ again in the memory 40. In this case, the processor 20 may store the updated time and user identification information along with the 3-1$^{th}$ user motion range in the memory 40.

As described above, as a user motion range is continuously updated, a user motion range according to a user's exercise history may be adjusted in real time, and a more accurate user motion range may be determined.

Although a shoulder press for strengthening the shoulder is illustrated as exercise equipment in the above embodiment, the present disclosure is not limited thereto, and any exercise equipment that repeatedly reciprocates a load applied by using a load applying unit may be used in various ways.

Other aspects, features, and advantages of the disclosure will become more apparent from the drawings, the claims, and the detailed description. These general and specific embodiments may be implemented by using a system, a method, a computer program, or a combination thereof.

The invention claimed is:

1. An exercise equipment device comprising:
   an exercise device body comprising a load applying unit, comprising at least one of a plurality of weights and a motor, configured to add, reduce, or maintain a load according to a set exercise level, a handle moving according to a movement of a user, and a wire configured to transmit the load applied by the load applying unit to the handle;
   a sensor configured to detect movement information of the handle;
   a user input interface configured to input user information; and
   a processor configured to determine a first user motion range based on a detection result of the sensor and the user information,
   wherein the processor is further configured to determine the first user motion range based on the user information, an upper limit movement range in which the handle maximally moves in one direction from a state in which the handle is stopped, and a lower limit movement range in which the handle maximally moves in another direction from the state in which the handle is stopped, and
   wherein the processor is further configured to determine the upper limit movement range to be lower than a first critical motion range that is determined by averaging exercise histories of a plurality of users.

2. The exercise equipment device of claim 1, further comprising a memory configured to store a first adjustment motion range determined according to the user information,
   wherein the processor is further configured to determine the first user motion range based on the first adjustment motion range, and the upper limit movement range and the lower limit movement range.

3. The exercise equipment device of claim 2, further comprising a display configured to display output information to the user,
   wherein the memory is further configured to store the first critical motion range determined according to the user information,
   wherein the processor is further configured to, when the upper limit movement range and the lower limit movement range are outside the first critical motion range, control the display to display a warning signal and a re-measurement signal.

4. The exercise equipment device of claim 3, wherein the processor is further configured to, when the upper limit movement range and the lower limit movement range are outside the first critical motion range two or more times, determine the upper limit movement range and the lower limit movement range as the first user motion range.

5. The exercise equipment device of claim 2, wherein the user information comprises at least one of the user's age, gender, height, weight, and exercise experience.

6. An exercise equipment device comprising:
   an exercise device body comprising a load applying unit, comprising at least one of a plurality of weights and a motor, configured to add, reduce, or maintain a load according to a set exercise level, a handle moving according to a movement of a user, and a wire configured to transmit the load applied by the load applying unit to the handle;
   a sensor configured to detect movement information of the handle;
   a user input interface configured to input user information; and
   a processor configured to determine a second user motion range based on a detection result of the sensor and the user information,
   wherein the processor is further configured to determine the second user motion range based on an upper limit average movement range that is an average value of upper limit movement ranges in which the handle maximally moves in one direction multiple times from a state in which the user manipulation unithandle is stopped and a lower limit average movement range that is an average value of lower limit movement ranges in which the handle maximally moves in another direction multiple times from the state in which the handle is stopped, and wherein the processor is further configured to determine the upper limit average movement range to be within a first critical motion range that is determined by averaging exercise histories of a plurality of users.

7. The exercise equipment device of claim 6, further comprising a memory configured to store a second adjustment motion range determined according to the user information, wherein the processor is further configured to determine the second user motion range based on the second adjustment motion range, and the upper limit average movement range and the lower limit average movement range.

8. The exercise equipment device of claim 7, wherein the memory is further configured to store a second critical motion range determined according to the user information, wherein the processor is further configured to, when an upper limit movement range in which the handle maximally moves in the one direction from the state in which the handle is stopped and a lower limit movement range in which the handle maximally moves in another direction from the state in which the handle is stopped are outside the second critical motion range, determine the second user motion range by excluding the upper limit movement range and the lower limit movement range in the upper limit average movement range and the lower limit average movement range.

9. The exercise equipment device of claim 8, wherein the processor is further configured to, when the upper limit movement range in which the handle maximally moves in one direction from the state in which the handle is stopped and the lower limit movement range in which the handle maximally moves in another direction from the state in which the handle is stopped are outside the second critical motion range three or more times, determine the second user motion range by including the upper limit movement range and the lower limit movement range in the upper limit average movement range and the lower limit average movement range.

10. The exercise equipment device of claim 7 or 8, wherein the user information comprises at least one of the user's age, gender, height, weight, and exercise experience.

11. An exercise equipment device comprising:

an exercise device body comprising a load applying unit, comprising at least one of a plurality of weights and a motor, configured to add, reduce, or maintain a load according to a set exercise level, a handle configured to move according to a movement of a user, and a wire configured to transmit the load applied by the load applying unit to the handle;

a sensor configured to detect movement information of the handle;

a user input interface configured to input user information;

a processor configured to determine a third user motion range based on a detection result of the sensor and the user information;

a server configured to receive and store the third user motion range; and a communication interface configured to transmit the third user motion range determined by the processor to the server, wherein the processor is further configured to determine the third user motion range based on the user information, an upper limit movement range in which the handle maximally moves in one direction from a state in which the handle is stopped, and a lower limit movement range in which the handle maximally moves in another direction from the state in which the handle is stopped, and wherein the processor is further configured to determine the upper limit movement range to be lower than a first critical motion range that is determined by averaging exercise histories of a plurality of users.

12. The exercise equipment device of claim 11, wherein the processor is further configured to control the communication interface to receive the third user motion range from the server, based on the user information input to the user input interface.

13. The exercise equipment device of claim 11, further comprising a display configured to provide output information to the user, wherein the processor is further configured to control the display to display the third user motion range.

14. The exercise equipment device of claim 11, wherein the processor is further configured to determine a 3-$1^{th}$ user motion range, comprising a first upper limit average movement range, a first lower limit average movement range, a plurality of upper limit movement ranges, and a plurality of lower limit movement ranges, based on the third user motion range received from the server, and a plurality of upper limit movement ranges in which the handle maximally moves in one direction multiple times from athe state in which the handle is stopped and a plurality of lower limit movement ranges in which the handle maximally moves in another direction multiple times from the state in which the handle is stopped.

15. The exercise equipment device of claim 14, wherein the processor is further configured to control the communication interface to transmit the 3-$1^{th}$ user motion range to the server.

* * * * *